(12) United States Patent
Mehnert et al.

(10) Patent No.: US 7,098,654 B2
(45) Date of Patent: Aug. 29, 2006

(54) POSITION DETECTOR

(76) Inventors: Walter Mehnert, Grillparzerstr. 6, Ottobrunn (DE) 85521; Thomas Theil, Waldstr. 9, Aufhausen (DE) 85258

( * ) Notice: Subject to any disclaimer, the term of this patent is extended or adjusted under 35 U.S.C. 154(b) by 70 days.

(21) Appl. No.: 11/019,541

(22) Filed: Dec. 23, 2004

(65) Prior Publication Data
US 2006/0056575 A1 Mar. 16, 2006

(30) Foreign Application Priority Data
Dec. 24, 2003 (DE) .............. 203 20 021 U
Jan. 13, 2004 (DE) ............ 20 2004 000 413 U
Feb. 13, 2004 (DE) ............ 20 2004 002 273 U

(51) Int. Cl.
*G01B 7/30* (2006.01)
*G01R 33/00* (2006.01)

(52) U.S. Cl. .............. 324/207.25; 324/207.24; 324/239; 324/244

(58) Field of Classification Search .................. 324/207.24–207.25
See application file for complete search history.

(56) References Cited
U.S. PATENT DOCUMENTS
5,856,743 A * 1/1999 Juniman ............ 324/207.25

2003/0094945 A1 * 5/2003 Netzer .................... 324/260

* cited by examiner

*Primary Examiner*—Bot Ledynh
(74) *Attorney, Agent, or Firm*—Sughrue Mion, PLLC

(57) ABSTRACT

A position detector for counting rotational and/or translatory movements in at least one direction has at least one exciter magnet (2), a single ferromagnetic element (6) and at least one induction coil (7). Relative movements between the exciter magnet and the ferromagnetic element represent the movements to be counted. The energy which is taken from the movement of those two elements during the approach as therebetween and which is accumulated by means of the ferromagnetic element is liberated in the form of a voltage pulse produced in the induction coil when a given relative position is reached. A rectifier circuit (24) rectifies the voltage pulses and charges a capacitor (28). Upon the occurrence of a voltage pulse to be counted at least one comparator circuit (22) produces a pulse recognition signal which a non-volatile counting and memory circuit (32) counts and stores, the charge in the capacitor serving for power supply purposes. A data read circuit (34, 34') takes over further processing and output of the data of the counting and memory circuit to a user and a control circuit (30, 30') prevents mutual interference as between the counting and memory circuit and the data read circuit.

20 Claims, 4 Drawing Sheets

POSITION DETECTOR

CROSS-REFERENCES TO RELATED APPLICATIONS

This application claims the priorities of German Utility Model application Serial No 203 20 021.7 filed Dec. 24, 2003, German Utility Model application Serial No 20 2004 000 413.5 filed Jan. 13, 2004 and German Utility Model application Serial No 20 2004 002 273.7 filed Feb. 13, 2004, the subject-matter of which is incorporated herein by reference.

FIELD OF THE INVENTION

The invention concerns a position detector for countingly detecting translatory and/or rotational movements, preferably in a predetermined direction, which can be autonomous insofar as it can carry out at least the required counting and storage operations independently of an external power source.

BACKGROUND OF THE INVENTION

For that purpose a position detector can comprise a sensor portion including at least one permanent magnet which serves as an exciter magnet and which moves with the body whose movements are to be counted, that is to say for example with a rotating shaft or a reciprocating machine carriage, in which respect it is generally fixed directly to that body or is coupled thereto in such a way that it reflects the movement thereof.

In addition the sensor portion of the position detector has a 'ferromagnetic element' which is referred to in that fashion herein and which comprises a combination of hard-magnetic and/or soft-magnetic components which, upon the application of an external magnetic field of given magnitude, by virtue of an abrupt change in its consistency (for example switching and/or alignment of a large number of the Weiss domains present therein) and/or geometry (change in position of ferromagnetic components in space), result in an abrupt change in the magnetic flux and thus in a corresponding voltage pulse of given power in a coil surrounding same. The abrupt change in the ferromagnetic element is therefore described by an abrupt switching of the Weiss domains or by an abrupt change in reluctance.

A particular configuration of the first-mentioned group are pulse and Wiegand wires which do not make use of any macroscopic mechanical effect in production of the above-mentioned voltage pulses.

A representative of the second group in which mechanical macroscopic effects—here storage of the subsequently produced electrical energy in a spring—are used are magnetic reed contacts, as are set forth in U.S. Pat. No. 6,628,741. Major disadvantages precisely of that specific structure are mechanical fatigue and uncontrolled bouncing of the contacts as well as the slight measuring effect. A minimal solution which is optimum in terms of cost is scarcely to be achieved in that respect.

EP 0 658 745 A2 discloses a position sensor in which the ferromagnetic element comprises a rotatably mounted permanent magnet and an iron core, to which the rotatably mounted permanent magnet 'holds on' until the magnetic repulsion force which the approaching exciter magnet exerts thereon becomes so great that it overcomes the holding force between the iron core and the rotatably mounted permanent magnet and the latter abruptly rotates about its axis. That causes an abrupt change in the position of the Weiss domains and therewith the magnetic flux which passes through an induction coil wound on the iron core (large dΦ/dt), and a usable voltage pulse is induced in that coil.

What is common to all those solutions is that the respectively induced voltage pulse not only serves as a signal pulse to be counted, but it can also be used for the power supply for at least a part of the electronic system arranged downstream of the sensor portion, so that the system is capable, without an external supply of electrical energy, of executing the counting and storage operations required for detecting the movement to be monitored, that is to say for example for counting the revolutions of a shaft or the reciprocating movements of a carriage and storing the count value obtained in that situation so that such value is available for an external user.

SUMMARY OF THE INVENTION

An object of the invention is to design a position detector for detecting a rotational and/or translatory movement, which can be implemented at a low level of technical and cost expenditure.

A further object of the invention is to provide a position sensor having an energy consumption which is as low as reasonably possible and of a minimal structural size.

According to the invention there is provided a position detector which for countingly detecting rotational and/or translatory movements in preferably a predeterminable direction comprising at least one exciter magnet, a single ferromagnetic element, and at least one induction coil associated with the ferromagnetic element, wherein the movement to be, detected is represented by a relative movement between the exciter magnet and the ferromagnetic element and the energy which is taken from the kinetic energy of the movement to be detected during the approach as between those two elements and accumulated by means of the ferromagnetic element is abruptly liberated upon the attainment of a given relative position and thus a given magnetic field strength and a voltage pulse is produced by the sudden change in the magnetic flux in the induction coil. The detector further includes as an electronic system at least one rectifier circuit for rectifying voltage pulses of the induction coil, at least one capacitor which can be charged up by voltage pulses in the same direction, at least one comparator circuit which produces a pulse recognition signal upon the occurrence of a voltage pulse to be counted, a non-volatile counting and memory circuit which is formed by a register, in the form of a memory, of a counter and executes a counting and storage operation for each pulse recognition signal, wherein the electrical energy stored in the capacitor serves for the power supply at least of the non-volatile counting and memory circuit, a data read circuit which serves for further processing and output of the data stored in the non-volatile counting and memory circuit to an external user, and a control circuit which prevents interference with the counting and storage operation by operation of the data read circuit and vice-versa.

The electronic system defined therein includes the minimal circuitry configuration which is required for counting movement processes such as for example revolutions of a shaft or reciprocating movements of a carriage or the like and storing the respectively ascertained count value, without in that respect being reliant on an external power supply. Provided for those functions are in particular the at least one rectifier circuit, the at least one capacitor, the at least one comparator circuit and the non-volatile counting and memory circuit. As the count values ascertained must be made available to a user, the arrangement further includes a data read circuit and a control circuit, wherein the latter provides for trouble-free implementation of the counting and storage operations on the one hand and the reading operations on the other hand, in respect of which the data read circuit takes over the respectively present count value in order to make it available to a user, optionally in processed form.

A particularly preferred feature according to the invention provides that the components and circuit units belonging to the electronic system are combined in an IC component to afford an integrated circuit so that the entire position detector then consists of only three units, namely the exciter magnet, the ferromagnetic element with induction coil wound thereon and the IC component.

Transfer of the stored data to a user can be effected in two fundamentally different ways:

a) The reading operations (in each case: adoption of the counter condition contained in the non-volatile counting and memory circuit by the data read circuit and subsequent data transfer) are initiated by inquiry signals sent by the user and which can occur at any moment in time, thus constituting asynchronous operation.

b) The reading operations are controlled by the electronic system of the position detector itself so that there cannot be any conflict with the counting and storage operations which can occur at any moments in time, but at time intervals which are not less than a minimum value by virtue of the movement to be monitored, thus constituting synchronised operation.

In case a) the control circuit provides inter alia that, when a reading operation is initiated and takes place, the occurrence of a voltage pulse to be counted initially does not trigger any counting and storage operation but is in intermediate storage until the reading operation is concluded in order then to provide for counting of the event which has been placed in intermediate storage, and storage of the new count value, so that no count errors occur.

As the user, by virtue of his inquiry signal, must be able to initiate a reading operation even when no voltage pulse to be counted has occurred for a prolonged period of time so that the capacitor cannot provide any electrical energy, circuit components which are required for the reading operation are supplied with external electrical energy at least for the period of time which is required for that purpose.

The variant a) requires the following conditions to be met:

the data read circuit, after the occurrence of an inquiry signal, accesses the counting and storage circuit with a certain dead or delay time which is longer than the time required for a counting and storage operation;

the energy stored in the at least one capacitor, in spite of inevitable leakage currents, is kept at such a high level thereby at least for the duration of the period of time required for a reading operation, that a counting event which has been in intermediate storage can still be surely processed although the energy supply from the exterior is switched off again at the end of the reading operation; and the time between two counting and storage operations is greater than the sum of the times which are required for a counting and storage operation and data transmission.

In case b) those conditions do not have to be met as the electronic system of the position detector can always establish whether precisely no counting and storage operation is taking place and whether there is sufficient energy taken from the movement to be monitored and stored in electrical form in order to be able to execute a reading operation. Here therefore it is possible to construct a position detector which is completely autonomous in operation, that is to say which is entirely independent of an external source of electrical energy.

If the energy required for the reading operation is high, because for example data transfer to the user is to be effected by means of a transmitter by radio, it is possible to provide a further capacitor which for example is charged with a plurality of voltage pulses which come from the induction coil and whose polarity is opposite to the polarity of the pulses to be counted, until sufficient electrical energy is available.

These and further advantageous features of a position detector according to the invention are set forth in the appendant claims.

Further objects, features and advantages of the invention will be apparent from the description hereinafter by way of example of preferred embodiments thereof.

DESCRIPTION OF PREFFERED EMBODIMENTS

Figure 1:
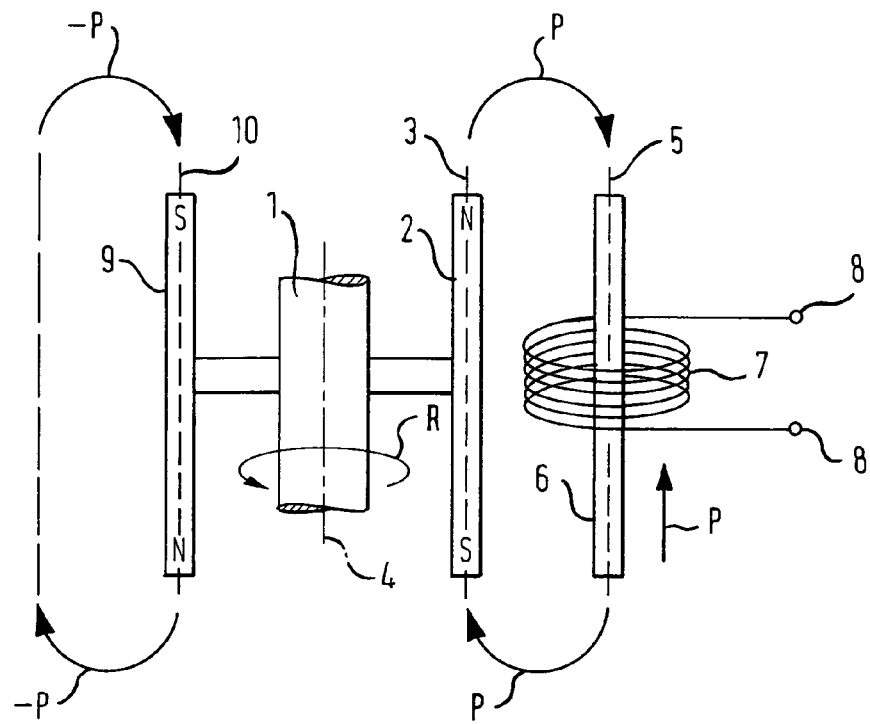
FIG. 1 diagrammatically shows the sensor arrangement of a position detector according to the invention for detecting a rotational movement, in a first embodiment, FIG. 2 diagrammatically shows the sensor arrangement of a position detector according to the invention for detecting a rotational movement, in a second embodiment, FIG. 3 diagrammatically shows the sensor arrangement of a position detector according to the invention for detecting a rotational movement, in a third embodiment, FIG. 4 diagrammatically shows the sensor arrangement of a position detector according to the invention for detecting a translatory movement, in a fourth embodiment, FIG. 5 diagrammatically shows the sensor arrangement of a position detector according to the invention for detecting a translatory movement, in a fifth embodiment, FIG. 6 diagrammatically shows the sensor arrangement of a position detector according to the invention for detecting a translatory movement, in a sixth embodiment.

In FIGS. 1 through 6 and FIGS. 7 through 9 respectively identical parts are denoted by identical references.

Referring generally to the drawing, all the illustrated embodiments include at least one exciter magnet 2 which is connected to a component or body whose movement is to be monitored, in such a way that it performs that movement to be monitored with the body or it represents such movement. In that respect the exciter magnet 2 periodically approaches a ferromagnetic element which is shown in FIGS. 1 through 6 in the form of a wire element, which can be formed for example by a pulse wire or a Wiegand wire, and which is referred to hereinafter for brevity as the sensor wire 6. What is essential is that such a sensor wire 6, like any other ferromagnetic element which is suitable for that purpose, for example also a reed contact arrangement, is capable, as the exciter magnet 2 approaches, of assisting with the increasing accumulation or storage of energy in the magnetic field existing between it and the exciter magnet, wherein said energy is derived from the kinetic energy of the body to be monitored. When the exciter magnet 2 reaches a given position with respect to the ferromagnetic element and thus the magnetic field strength prevailing in the ferromagnetic element reaches a given magnitude, the accumulated energy is abruptly liberated, even if the approach movement takes place extremely slowly. In the case of the above-mentioned pulse or Wiegand wires, that is effected in such a way that the Weiss domains of the wire in question, which form a unitary magnetic domain, switch over within a very short period of time in the form of a travelling wave so that a high $d\Phi/dt$ is induced in an induction coil 7 wound on to the sensor wire 6 and a correspondingly large voltage pulse can be taken off at the terminals 8 thereof. That pulse contains sufficient electrical energy for it not only to be used as a signal, that is to say counting pulse, but also to supply the electronic system provided for counting thereof and for storage of the count value achieved, with the energy required for carrying out those operations, so that this forms a position detector which in that respect is autonomous, that is to say which is independent of an external voltage supply.

In the embodiment illustrated in FIG. 1 a first exciter magnet 2 is fixed to a rotating shaft 1 in such a way that the straight line 3 connecting its two magnetic poles extends permanently parallel to the axis of rotation 4. The longitudinal axis 5 of the sensor wire 6 also extends parallel to that direction; wound on to the sensor wire 6 is the induction coil 7, at the terminals 8 of which a voltage pulse can be taken off, by virtue of the described processes, whenever the first exciter magnet 2 has reached approximately the position shown in FIG. 1, in the rotary movement of the shaft 1 which takes place in the direction indicated by the arrow R, and the direction of biasing or polarisation of the sensor wire 6, indicated by the arrow p in FIG. 1, is in opposite relationship to the direction of the magnetic field passing therethrough, as indicated by the arrow P in FIG. 1.

After the production of such a voltage pulse the sensor wire and the magnetic field passing therethrough are then identically polarised, that is to say the sensor wire is biased in a direction opposite to its previous polarisation direction p, so that, without further measures, when the first exciter magnet 2 next moves past the sensor wire 6, at most an improvement in the bias effect would be achieved, which is only linked to the induction of a weak voltage pulse (attenuated pulse). Therefore the embodiment illustrated in FIG. 1 has a second exciter magnet 9 which is fixed to the shaft 1 on the side thereof which is in diametrally opposite relationship to the first exciter magnet 2, in such a way that the straight line 10 connecting its magnetic poles also extends parallel to the axis of rotation 4, but its polarisation –P is in precisely the opposite direction to that of the first exciter magnet 2. It is clear that, when the second exciter magnet 9 moves past the sensor wire 6 after the first exciter magnet 2 has moved therepast previously, the sensor wire 6 is triggered again and biased in opposite relationship and a voltage pulse is also produced in the induction coil 7 wound thereon, the amplitude of that voltage pulse being of approximately the same absolute value as that of the voltage pulse triggered by the first exciter magnet 2 but its polarity being precisely opposite to that of the voltage pulse triggered by the first exciter magnet 2 so that it can be readily distinguished therefrom. If it is only full revolutions of the shaft 1 that are to be counted, then the voltage pulses caused by the second exciter magnet 9 are suppressed in terms of the counting operation, which is readily possible by virtue of its opposite polarity. The energy contained therein however can also be used for energy supply purposes, as will be described in greater detail hereinafter with reference to FIG. 9. The second exciter magnet 9 may also be at a different angular spacing from 180°, from the first exciter magnet 2.

What is essential in the embodiment shown in FIG. 1 is that the straight lines 3 and 10 which connect the poles of the first and second exciter magnets 2 and 10 respectively, upon rotation of the shaft 1, rotate about the axis of rotation 4 and in so doing constantly move in parallel relationship with themselves in such a way that they alternately approach the sensor wire 6 as far as a minimum spacing (this is shown in FIG. 1 in respect of the first exciter magnet) and in so doing produce voltage pulses with alternate signs in order then to move away from the sensor wire 6 again as far as a maximum spacing (shown in FIG. 1 in respect of the second exciter magnet).

Figure 2:
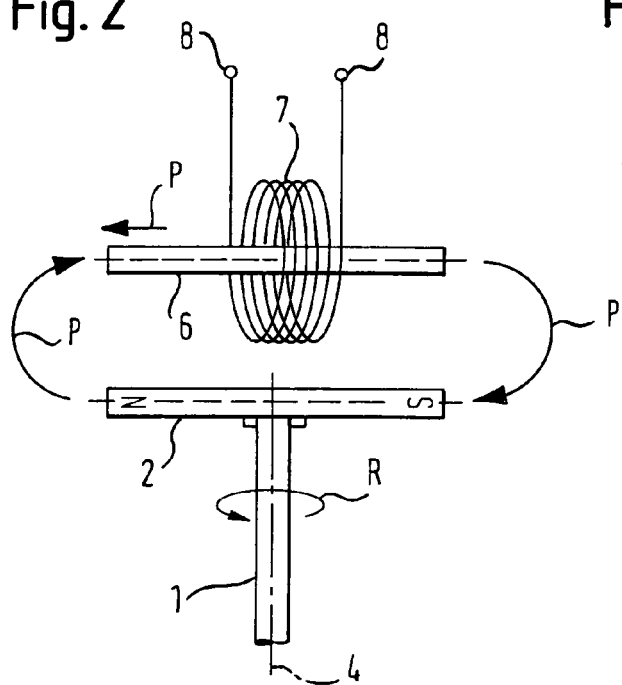

In comparison, in the embodiment illustrated in FIG. 2, the exciter magnet 2 is mounted to the rotating shaft 1 in such a way that the straight line 3 which connects its magnetic poles together extends perpendicular to the axis of rotation 4 and the sensor wire 6 is constantly at the same spacing from the plane defined by the straight line 3 in the rotational movement of the shaft 1. Switching of the Weiss domains of the sensor wire 6 and thus the production of a voltage pulse in the induction coil 7 is effected here when the straight line 3 and the longitudinal axis 5 of the sensor wire 6 extend relative to each other at an angle of between approximately 120° and 150° and the polarisation directions are virtually in opposite relationship. That is the case twice in each full revolution of the shaft 1, wherein, in one of those two positions, of which one is shown in FIG. 2, the magnetic poles of the exciter magnet 2 are oriented in opposite relationship to the other position so that in the one position 'resetting' of the sensor wire 6 takes place and in the other position production of the 'actual' counting pulse occurs. The selection of which of the two voltage pulses which occur in each full revolution and which are of approximately the same amplitude but of the opposite sign, is to serve as a resetting pulse and which is to serve as a counting pulse is more or less random and can be established by the forward direction of a half-wave rectifier belonging to the electronic processing system.

Figure 3:
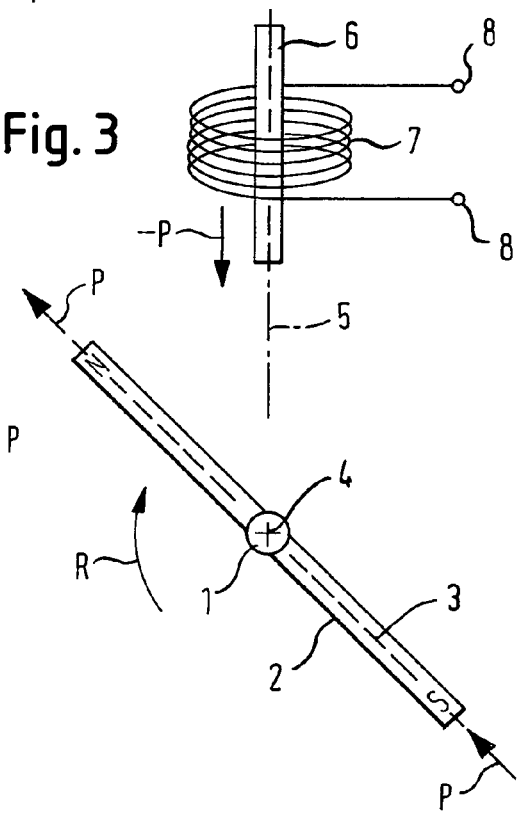

In the embodiment shown in FIG. 3 the longitudinal axis 5 of the sensor wire 6 is disposed in the plane which upon rotation of the shaft 1 is defined by the straight line 3 which connects the magnetic poles of the exciter magnet 2 together. In this case a respective voltage pulse is then triggered in the induction coil 7 which is wound on the sensor wire 6, before the straight line 3 is aligned with the longitudinal axis 5 of the sensor wire 6. Thus, a voltage pulse is produced twice in each full revolution of the shaft 1, as was described hereinbefore with reference to FIG. 2. The information set forth at that juncture regarding the signs of those pulses also applies here in the same manner.

Figure 4:
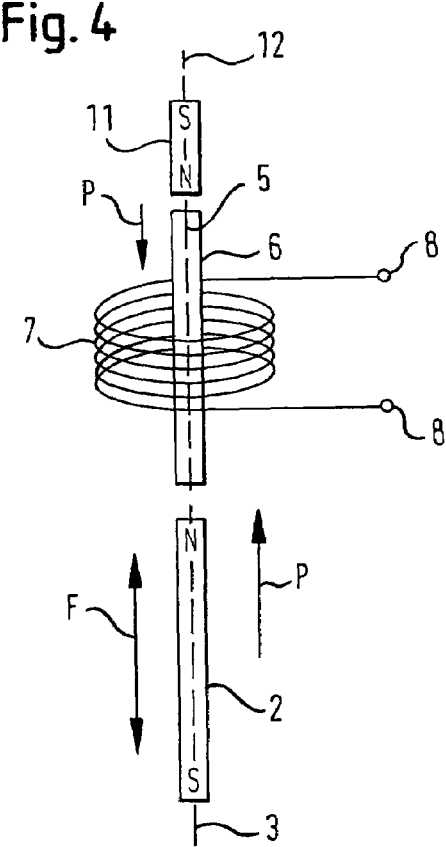
Figure 5:
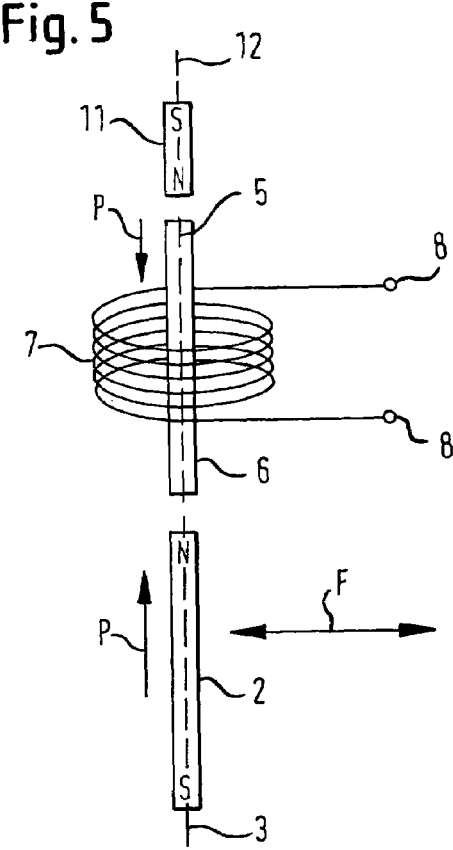
Figure 6:
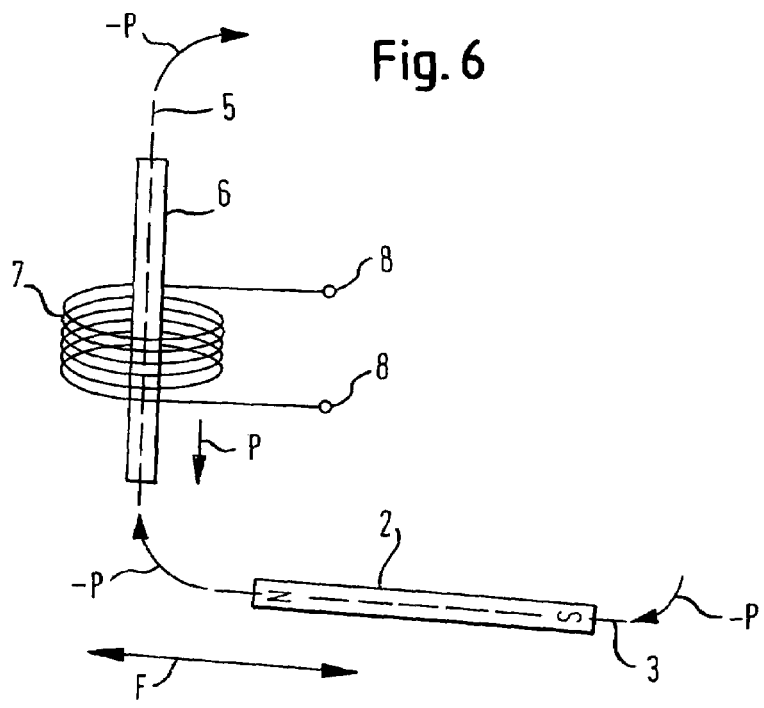

FIGS. 4 through 6 diagrammatically show three embodiments of the relative arrangement of the exciter magnet 2 and the sensor wire 6 in position detectors for detecting a translatory movement. In all these cases the longitudinal axis 5 of the sensor wire 6 is disposed in the plane which is defined by the straight line 3 which connects the magnetic poles of the exciter magnet 2 together, upon the reciprocating movement thereof, as indicated by the respective double-headed arrow F.

In FIG. 4 the straight line 3 connecting the magnetic poles of the exciter magnet 2 together and the longitudinal axis 5 of the sensor wire 6 are constantly aligned with each other and the voltage pulse used for the counting operation is produced in the induction coil 7 when, upon a forward movement of the exciter magnet 2 relative to the sensor wire 6, the North pole of the exciter magnet 2 has reached a sufficiently small spacing from the end of the sensor wire 6, which is downward in FIG. 4. Because the exciter magnet acts with only one polarisation on the ferromagnetic element, resetting of the sensor wire 6 is effected by means of a stationary permanent magnet 11 which is arranged on the side of the sensor wire 6 in opposite relationship to the exciter magnet 2, at a small spacing, in such a way that the straight line 12 connecting its magnetic poles together is also aligned with the longitudinal axis 5 of the sensor wire 6, its polarity being precisely opposite to that of the exciter magnet 2. The field strength of the permanent magnet 11 is less than that of the exciter magnet 2 so that it cannot prevent it from switching over the Weiss domains of the sensor wire 6 in the event of a sufficient approach movement. If then the exciter magnet 2 reverses its direction of movement the permanent magnet 11 switches the Weiss domains of the sensor wire 6 back again when the exciter magnet 2 has reached a sufficient large spacing.

In the embodiment illustrated in FIG. 5 the reciprocating movement of the exciter magnet 2 takes place in perpendicular relationship to the straight line 3 which connects its magnetic poles together and the longitudinal direction 5, which is parallel thereto, of the sensor wire 6. The voltage pulse to be counted is produced in the induction coil 7 when the exciter magnet 2 has sufficiently approached the position illustrated in FIG. 5, in which the straight line 3 and the longitudinal axis 5 are approximately aligned with each other. The permanent magnet 11 which is also provided here has a corresponding function to that which was described with reference to FIG. 4.

In the embodiment illustrated in FIG. 6 the reciprocating movement of the exciter magnet 2 takes place in the direction of the straight line 3 which connects its magnetic poles together and perpendicularly to the longitudinal direction 5 of the ferromagnetic element 6, with a stroke length which is at least so great that, in the case of a complete reciprocating movement, on the one hand the South pole and on the other the North pole of the exciter magnet 2 alternately pass the ferromagnetic element 6 facing theretowards, in which case the element 6 experiences magnetic reversal on each occasion and a voltage pulse is produced in the induction coil 7, of which one can be selected as a pulse to be counted and the other which is of an opposite voltage sign can be selected as a further voltage pulse which is not to be counted. A separate permanent magnet is not required here.

In all these embodiments the exciter magnet 2 can be both of a circular and also a square or other rectangular cross-section in order to focus the magnetic flux lines issuing therefrom in such a way that they pass through or act on the ferromagnetic element in the optimum manner.

Figure 7:
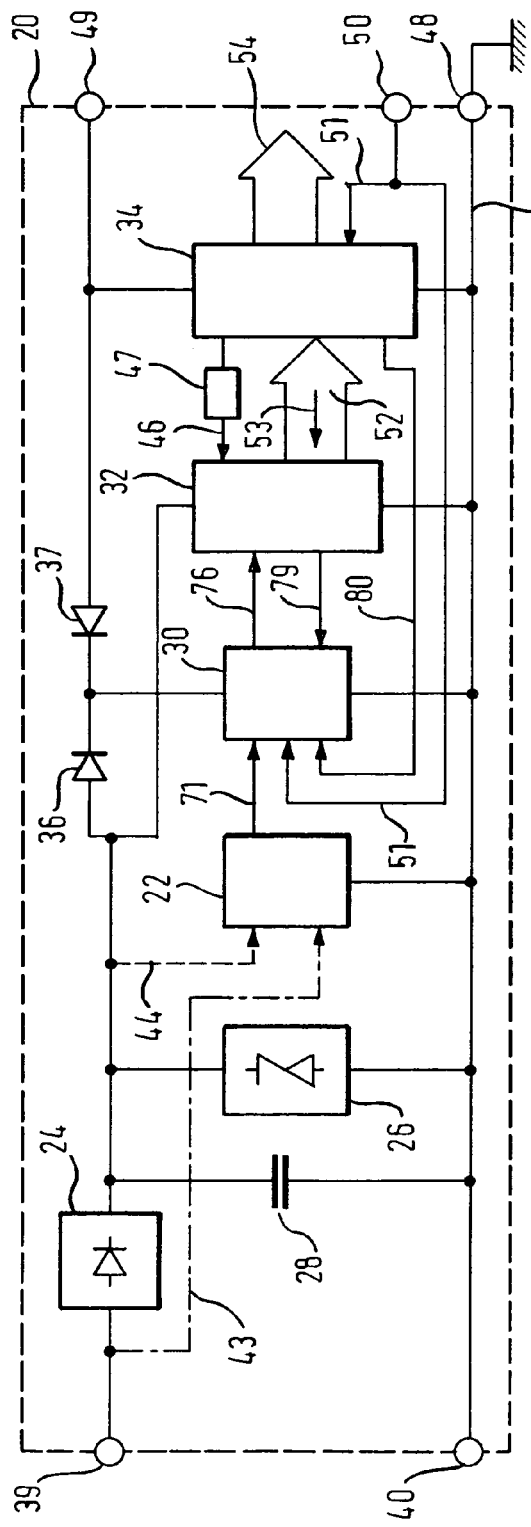
FIG. 7 shows a circuit diagram illustrating the principle of an electronic processing system for a position detector according to the invention whose data read circuit is actuable for a reading operation by a user at any moments in time.

FIG. 7 shows two variants of the electronic processing system of a position detector according to the invention, which differ from each other in respect of the queried voltage level, upon the attainment of which a counting and storage operation is triggered.

All circuit units are disposed in an IC component 20 indicated by a broken line.

More specifically the IC component 20 includes a comparator circuit 22, a rectifier circuit 24, a voltage limiting circuit 26, a capacitor 28, a control circuit 30, a non-volatile memory and counting circuit 32, a data read circuit 34 and two diodes 36 and 37.

The voltage pulses coming from the terminals 8 of the induction coil 7 are fed to the IC component 20 by way of its input terminals 39, 40 of which the former is connected to the ground line 41 passing therethroughwhile the other is connected to the rectifier circuit 24.

The rectifier circuit 24 is identified by the symbol for a diode and in the simplest case can consist of a single diode which is of such a polarity that it transmits either only voltage pulses of negative amplitude or, as shown in FIG. 7, only voltage pulses of a positive amplitude.

As a comparatively high voltage is dropped at a diode in the forward direction, the rectifier circuit 24 used is preferably a switching transistor with a substantially lower forward voltage, being controlled in such a way that it transmits voltage pulses of a predetermined polarity coming from the induction coil 7, blocks voltage pulses of the opposite polarity, and in addition prevents discharge of the downstream-connected capacitor 28 by way of the induction coil 7.

Alternatively the rectifier circuit 24 can also be formed by a Grätz bridge, which affords the advantage that the capacitor 28 can be charged by all voltage pulses delivered by the induction coil 7 and counted and stored each half revolution.

In order to trigger a counting and storage operation only when the capacitor has been charged to the required extent, the attainment of a suitable voltage level is the subject of inquiry by means of the comparator circuit 22.

In a first variant the comparator circuit 22 is connected by way of a line 43 to the input terminal 39 at which the voltage pulses coming from the induction coil appear. In that case, it produces a pulse recognition signal which leads to a counting and storage operation, for example when the amplitude of such a voltage pulse, after passing through a positive maximum value, passes downwardly through a predeterminable level, as that is an indication that the capacitor 28 is charged to its maximum. In that way generally only voltage pulses of one polarity (here: positive polarity) and thus entire revolutions or complete reciprocating movements are counted. It is advantageous with this arrangement that each one to be counted can be detected independently of the charge condition of the capacitor 28, which the latter has immediately prior to the occurrence of that voltage pulse.

In a second variant the comparator circuit 22 is connected to the output of the rectifier circuit 24 by way of a line 44, that is to say it queries the voltage at the capacitor and produces a pulse recognition signal leading to a counting and storage operation when the absolute value of that voltage, which rises upon the occurrence of a voltage pulse, exceeds a predeterminable level in an upward direction. That level is so selected that it is just below the maximum value which is predetermined by the voltage limiting circuit 26, and the fact that it is exceeded therefore also indicates that the capacitor 28 is at maximum charge (soon). In the case of this variant, it is necessary to provide that the voltage at the capacitor 22 has fallen below the above-discussed level, prior to the occurrence of a voltage pulse to be counted. In this case therefore the arrangement will only use one half-wave rectifier circuit 24 and the capacitance of the capacitor 28 and the maximum value which is predetermined by the voltage limiting circuit 26 will be so matched to the electrical current requirement of the circuit units to be supplied from the capacitor 28 that the capacitor 28 is sufficiently discharged after the complete execution of a counting and storage operation. Alternatively or supplemental thereto, a controllable switch, for example in the form of a switching transistor, can be provided in parallel with the capacitor 28; closure of that switch provides that the capacitor 28 is necessarily completely discharged after the conclusion of each counting and storage operation.

In order to make it clear that, of the two lines 43, 44, there is only ever one that is present, they are illustrated by dash-dotted and dashed lines respectively.

In addition to the functions which have already been described hereinbefore, the voltage limiting circuit 26 which is identified by the symbol for a Zener diode performs the task of limiting the charging voltage of the capacitor 28 to a value which is non-critical in particular for the non-volatile counting and memory circuit 32 which is preferably in the form of a FRAM circuit. Admittedly those circuits are not immediately destroyed by excessively high supply voltages, but nonetheless their service life can be considerably curtailed by over-voltages.

In situations of use in which a particularly long service life does not play a part, the voltage limiting circuit 26 can also be omitted from the first variant in which the comparator circuit is connected to the input terminal 39 by way of the line 43.

A FRAM counting and memory circuit is advantageous for the reason that on the one hand it requires very little energy for a counting and storage operation while on the other hand it permits between $10^{12}$ and $10^{13}$ storage cycles. Therefore each individual voltage pulse can be not only counted but also immediately stored. When using a memory circuit technology whose service life is limited to a substantially lower number of storage cycles, in contrast the counting operations would have to be separated from the storage operations. In addition so much energy would have to be made available to each voltage pulse that a volatile counter could be supplied from the capacitor without losing its count value, even when prolonged time intervals are involved (for example in the region of 1 second) between successive voltage pulses. If with that technology the voltage pulses to be counted occur in succession at relatively small time intervals because the movement to be monitored takes place relatively quickly again, they must in fact be counted individually, but the count value must then be stored in the non-volatile memory only when the capacitor threatens to lose the required supply voltage in relation to a movement which again becomes slower, because of the related prolonged absence of a further count pulse. If therefore for example the capacitor at each voltage pulse has so much energy that on statistical average it is only every 100 voltage pulses that there occurs such a long pulse space that the supply voltage threatens to drop away excessively greatly, the number of the storage operations is only one hundredth of the number of the voltage pulses to be counted, whereby the total service life of the non-volatile memory is correspondingly prolonged.

In other words: the very long service life of the FRAM circuits makes it possible not only to count each individual voltage pulse but also to store the respectively associated count value immediately and, because of the low energy demand involved, to use sensor arrangements which for each voltage pulse supply comparatively little electrical energy as no pulse spaces have to be bridged over.

The capacitor 28 serves as an energy storage means which, after the occurrence of a voltage pulse to be counted, supplies both the control circuit 30 and in particular also the non-volatile counting and memory circuit 32 with electrical energy until the latter is certain to have processed that voltage pulse so that the position detector operates autonomously in respect of the counting and storage operations and is not reliant on an external voltage supply.

In the embodiment shown in FIG. 7 it is assumed that an inquiry signal can be applied by a user to the terminal 50 at any time, on the basis of which signal the data read circuit 34 is to read the counter condition contained in the counting and memory circuit and deliver same by way of the data line 54 to the user, possibly in re-coded form provided with protocol bits, that is to say, it is to operate as an interface in relation to a user. There is thus the possibility that an inquiry signal from a user and a pulse recognition signal which is triggered by a voltage pulse to be counted and which is delivered by the comparator circuit 22 occur simultaneously or at such a short time spacing that the operations triggered thereby could interfere with each other. In order to prevent, that the arrangement has the control circuit 30, the structure and mode of operation of which will be described in greater detail hereinafter with reference to FIG. 8.

As there is the possibility that, prior to a time at which the inquiry signal is applied, no further counting operation has occurred for a prolonged period of time, and the capacitor 28 can thus not provide electrical energy, an external power supply to be applied to the terminals 48, 49 is required for the control circuit 30 and the data read circuit 34. The diode 37 provides that the capacitor 28 does not in any event serve as a power source for the data read circuit 34 while the diode 36 prevents the capacitor 28 being charged up by virtue of the application of the external power supply or a defective counting and storage operation being triggered in the counting and memory circuit.

A reading operation is initiated by a read signal which is fed from the input 50 of the IC component 20 by way of the line 51 to the control circuit 30 and the data read circuit 34. If an I²C interface is used as the data read circuit 34, after the occurrence of a read signal it delays its access, by way of the line 46, to the counting and memory circuit 32 as standard by a fixed period of time, which is symbolically indicated in FIGS. 7 and 8 by a delay member 47 on the line 46. After that delay time the counter condition contained in the counting and memory circuit 32 is transmitted to the data read circuit 34 by way of the data line 52.

The data line 54 can also be part of a bus line or can be replaced by a radio connection between a transmitter (not shown) contained in the data read circuit 34 and a receiver to be found at the user. As generally a plurality of position detectors each having a respective transmitter are associated with a receiver, as is the case for example in the centralised detection of revolutions of water or gas meters or the like, each position detector must transmit not only the respective counter condition but also identification data which are stored in relation thereto and which clearly identify it, to the central user. Upon initiation of the system those characteristic data and an output counter condition can be read into the counting and memory circuit 32 by the data read circuit 34. That is symbolically indicated by the arrow 53 pointing in the opposite direction, in the data line 52.

The task of the control circuit 30 is to prevent mutual interference upon temporal coincidence as between a counting and storage operation on the one hand and a reading operation on the other hand since, as mentioned, those two kinds of event can occur totally independently of each other at any time.

Figure 8:
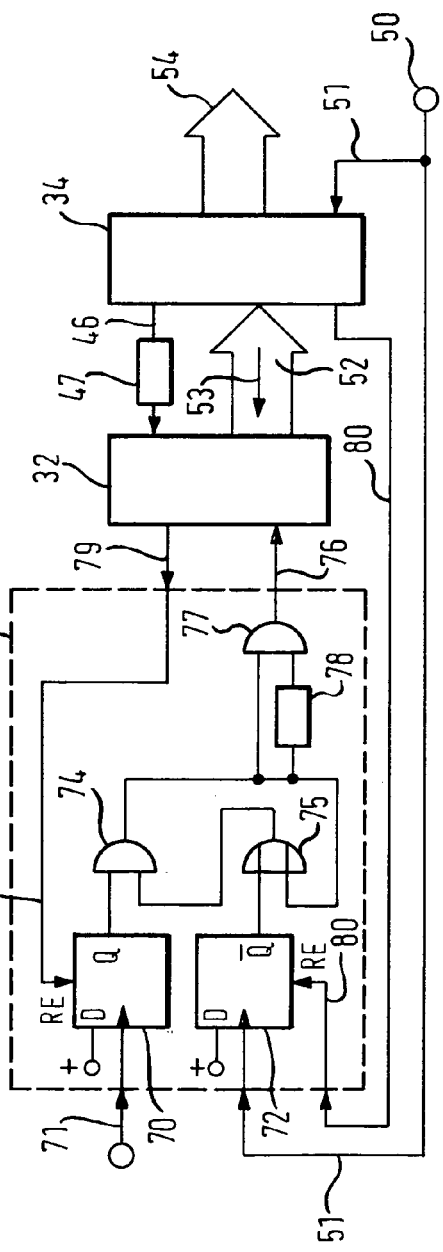
FIG. 8 shows a detail from FIG. 7.

As FIG. 8 shows for that purpose the control circuit 30 includes the following component parts:

a first memory 70 which can be in the form of a flip-flop which is normally reset (logic zero at the Q-output) and which is set by a pulse recognition signal applied to its clock input by way of the line 71 from the comparator circuit 22 so that at its Q-output it outputs a logic one serving as a counting signal level;

a second memory 72 which can be in the form of a flip-flop which is normally reset (logic one at the $\overline{Q}$-output) and is set by an inquiry signal applied to its clock input by way of the line 51 so that at its $\overline{Q}$-output it delivers a logic zero serving as a blocking signal level; and a blocking circuit 74 which can be in the form of an AND-gate with two inputs of which one is connected to the Q-output of the first memory 70 and the other to the output of an OR-gate 75, of the two inputs of which one is connected to the $\overline{Q}$-output of the second memory 72 and the other is connected to the output of the blocking circuit 74. That output also actuates the one input of an AND-gate 77 directly and the other input of that AND-gate 77 by way of a delay member 78. The blocking circuit 74 transmits a counting signal level coming from the first memory 70 by way of the AND-gate 77 and the line 76 to an edge-sensitive counting input of the counting and memory circuit 32 for triggering a counting and storage operation only when no blocking signal level occurs at its other input.

After termination of the storage operation in the counting and memory circuit 32 the latter on the line 79 applies a reset pulse to the first memory 70 and after termination of data output to the user a reset pulse is applied to the second memory 72 by the data read circuit 34 on the line 80.

The AND-gate 77, the delay member 78 and the OR-gate 75 form a spikes trap and hold circuit which, when a counting signal level and a blocking signal level occur almost at the same time, prevents the appearance of undefined spikes at the input of the counting and memory circuit.

The mode of operation of the control circuit 30 is as follows:

When the comparator circuit delivers a pulse recognition signal on the line 71, the first memory 70 is set.

If the second memory 72 is not set because no immediately preceding inquiry signal was applied by way of the line 51, the logic one at its $\overline{Q}$-output holds the blocking circuit 74 open and the counting signal level which appears at the Q-output of the first memory 70 passes by way of the AND-gate 77, with a very short delay caused by the delay member 78, to the counting and memory circuit 32 and there triggers a counting and storage operation.

If a short time later an inquiry signal occurs on the line 51, the second memory 72 is admittedly set, but the logic zero appearing thereby at its $\overline{Q}$-output remains ineffective as the OR-gate 75 applies the logic one present at the output of the blocking circuit 74 as a counting signal level to the second input of the blocking circuit 74 so that the latter holds itself as long as the first memory 70 is not reset. That inquiry signal which occurs a short time after a pulse recognition signal cannot interfere with the counting and storage operation which is just running since, as already mentioned, the data read circuit 34 accesses the counting and memory circuit 32 with the delay time which is symbolically indicated by the delay member 47 and which is so great that, even with an extremely short spacing between the pulse recognition signal and the subsequent inquiry signal the counting and storage operation is certain to be concluded when access is effected by the data read circuit 34.

If however upon setting of the first memory 70 the second memory 72 is already set because an inquiry signal has occurred prior to the pulse recognition signal, then the logic zero at the $\overline{Q}$-output of the set second memory 72, by way of the OR-gate 75, blocks the blocking circuit 74 and the counting signal level appearing at the Q-output of the first memory 70 remains ineffective until a signal which comes from the data read circuit by way of the line 80 and which indicates successful conclusion of the data read operation resets the second memory 72, whereby the blocking circuit 74 is enabled and the counting signal level which has been put into intermediate storage can trigger a counting and storage operation in the above-described manner.

If a pulse recognition signal occurs at such a short time spacing after an inquiry signal that the signal level at the output of the blocking circuit 74 admittedly still briefly rises, but the OR-gate then nonetheless closes the blocking circuit 74, the spike which is produced as a result is suppressed by the spike trap formed by the delay member 78 and the AND-gate 77.

As the control circuit 30 must then operate both when a voltage pulse to be counted occurs but no external supply voltage is applied to the terminals 48, 49 and also when an inquiry is to be effected without the capacitor 28 supplying an adequate supply voltage, it is connected to the two energy sources, in which respect, as already mentioned, the diodes 36, 37 serve for decoupling purposes.

Figure 9:
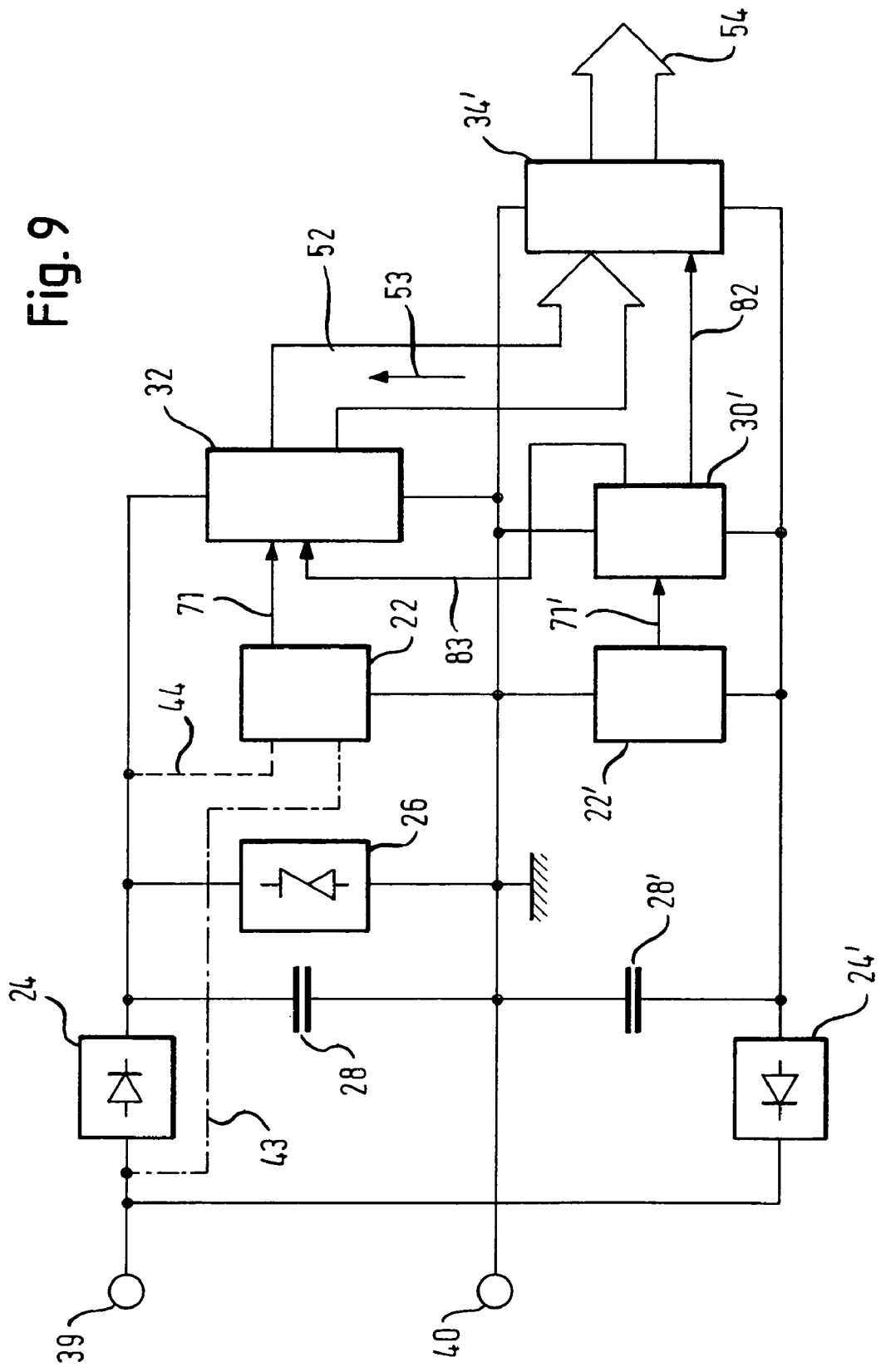
FIG. 9 shows a circuit diagram illustrating the principle of an electronic processing system for a position detector according to the invention whose data read circuit is actuable by the electronic system of the position detector for a reading operation at moments in time at which there is no risk of conflict with processing of a voltage pulse to be counted.

The electronic processing system shown in FIG. 9 for a position detector according to the invention includes, in the same manner as was described with reference to FIG. 7, a rectifier circuit 24, a capacitor 28, a voltage limiting circuit 26, a comparator circuit 28 which queries either by way of the line 43 the voltage pulses occurring at the input terminals 39, 40 or by way of the line 44 the voltage at the capacitor 28 in order to deliver a pulse recognition signal which here, unlike the situation with the above-described embodiment—and this is important—does not pass by way of a control circuit but directly by way of the line 71 to the counting input of a non-volatile counting and memory circuit 32, by way of the data line 52 of which the respectively attained counter condition can be delivered to a data read circuit 34' which transmits that data to a user by way of a data line 54 which can also be a radio section, if desired in re-coded form provided with protocol bits.

Otherwise the foregoing information set forth in regard to those circuitry configurations with reference to FIG. 7 applies here in the same fashion so that there is no need for renewed description at this juncture.

The essential difference in relation to the above-described embodiment is that here forwarding of the data does not take place in response to an inquiry signal coming from the user, which can occur at any moment in time, but is triggered by the control circuit 30' by a signal applied to the data read circuit on the line 82 and which is produced in time-displaced relationship relative to the voltage pulses to be counted, in such a way that there cannot be any mutual interference between the counting and storage operation on the one hand and the reading operation on the other hand.

An essential advantage of this concept is that the entire electronic processing system can operate autonomously, that is to say completely independently of an external supply with electrical power.

For that purpose the circuit arrangement includes a further rectifier circuit 24' which is of such a polarity that, with the voltage pulses which are of a polarity that is opposite to the voltage pulses to be counted, it charges up a further capacitor 28' whose charging voltage is checked by means of a further comparator circuit 22'. Whenever that charging voltage exceeds a predetermined level the comparator circuit 22' delivers on the line 71' a signal to the control circuit 30' which thereupon, by way of the lines 82, 83, actuates the data read circuit 34' and the counting and memory circuit 32 respectively for a reading operation by way of a data line 52 and subsequent forwarding of the data on the data line 54.

As the predetermined level of the charging voltage of the further capacitor 28' can only ever be exceeded when a voltage pulse appears, whose polarity is opposite to the polarity of the voltage pulses to be counted, there cannot be any time conflict between the counting and storage operations on the one hand and the reading operations on the other hand. The control circuit 30' can therefore be of a substantially simpler construction than was described for the control circuit 30 as, after actuation thereof by the comparator circuit 22', it only has to provide for the correct temporal sequence of the control signals to the counting and memory circuit 32 and the data inquiry circuit 34'.

If the data inquiry circuit 34' includes a transmitter which requires substantially more electrical power than is contained in a voltage pulse for forwarding the data to the user, the further capacitor 28' can be so large that it integrates the charges of a plurality of such pulses. The level interrogated by the comparator circuit 22' is then so selected that it is exceeded only when the capacitor has been charged up by a correspondingly large number of voltage pulses. In that case the further capacitor 28' will generally not be contained in the IC component, to which the other parts of the circuitry are preferably combined.

If conversely only very little energy is required by the data read circuit 34' in order to forward the stored and processed data to the user, the power supply both for the control circuit 30' and also the data read circuit 34' can be effected from the capacitor 28. The rectifier 24 is then preferably in the form of a Grätz bridge while the further rectifier 24', the further capacitor 28' and the further comparator circuit 22' can be omitted. The control circuit 30' can then for example trigger a data read operation without risk of conflict by virtue of delivering a suitable control signal after the execution of each counting and storage operation, while maintaining a safety time interval.

Another possibility provides using two comparators 22 and 22' which both interrogate the voltage pulses appearing at the inputs 39, 40 so that the one comparator 22 delivers a pulse recognition signal for example upon the occurrence of each positive voltage pulse and the other comparator 22' delivers a signal triggering a data read operation upon the occurrence of each negative voltage pulse, thereby also avoiding mutual interference.

It should be expressly pointed out that the electronic system of a position detector according to the invention does not necessarily have to be arranged in the immediate proximity of the sensor portion (comprising at least one exciter magnet, a ferromagnetic element and an induction coil). Rather, such a long line can be provided between the terminals 8 of the induction coil 7 and the input terminals 39, 40 of the electronic system that the electronic system is closer to the user than the sensor portion, in which case the data line 54 is then correspondingly short. In this case also the sensor portion and the electronic system form a unitary position detector in accordance with the present invention.

If a further induction coil or for example a Hall probe or a field plate is associated with the ferromagnetic element 6 so that the sensor portion of the position detector according to the invention comprises for example a reed contact arrangement and a Hall probe or another combination of the components just mentioned, the rotational and/or translatory movement can also be countingly detected in both directions.

It will be appreciated that the above-described embodiments of the position detector have been set forth by way of example and illustration of the invention and that further modifications and alterations may be made therein without thereby departing from the scope of the invention.

It will be expressly noted at this juncture that the reference numerals contained in the accompanying claims are included therein solely for greater ease of understanding thereof and in themselves are not intended as limiting the scope of the invention to the structures identified in the foregoing description by the respectively corresponding reference numerals.

The invention claimed is:

1. A position detector for countingly detecting rotational and/or translatory movements in preferably a predeterminable direction comprising
    at least one exciter magnet (2),
    a single ferromagnetic element (6), and
    at least one induction coil (7) operatively associated with the ferromagnetic element (6),
    wherein a movement to be detected is represented by a relative movement between the exciter magnet (2) and the ferromagnetic element (6) and the energy which is taken from the kinetic energy of the movement to be detected during the approach as between those two elements and accumulated by means of the ferromagnetic element is abruptly liberated upon the attainment of a given relative position and thus a given magnetic field strength and a voltage pulse is produced by the sudden change in the magnetic flux in the induction coil (7),
    and as an electronic system:
    at least one rectifier circuit (24) for rectifying voltage pulses of the induction coil (7),
    at least one capacitor (28) adapted to be charged up by voltage pulses in the same direction,
    at least one comparator circuit (22) adapted to produce a pulse recognition signal upon the occurrence of a voltage pulse to be counted,
    a non-volatile counting and memory circuit (32) which is formed by a register, in the form of a memory, of a counter and adapted to execute a counting and storage operation for each pulse recognition signal, wherein the electrical energy stored in the capacitor (28) serves for the power supply at least of the non-volatile counting and memory circuit (32),
    a data read circuit (34, 34') operable for further processing and output of data stored in the non-volatile counting and memory circuit (32) to an external user, and
    a control circuit (30, 30') operable to prevent mutual interference of a counting and storage operation and operation of the data read circuit (34, 34').

2. A position detector as set forth in claim 1, including
    wherein the control circuit (30') is operable to actuate the data read circuit (34') for further processing and output of data stored in the non-volatile counting and memory circuit (32) independently of a demand coming from the user and in that respect also the control circuit (30') and the data read circuit (34') are adapted to be supplied with electrical energy obtained from the movement to be monitored and stored in the electronic system.

3. A position detector as set forth in claim 2, including
    a further capacitor (28') for the energy supply for the data read circuit (34'), a further rectifier circuit (24') operable to charge up said further capacitor (28') by voltage pulses delivered by the induction coil (7) with a polarity opposite to the pulses to be counted, and a further comparator (22'), wherein the control circuit (30') is operable to actuate the data read circuit (34') for further processing and output of data stored in the non-volatile counting and memory circuit (32) only when the further capacitor (28') has reached a charging voltage which is recognised by the further comparator (22') and no counting and storage operation takes place, wherein in operation the data read circuit (34'), the further comparator (22') and the control circuit (30') are supplied with electrical energy by the further capacitor (28').

4. A position detector as set forth in claim 1, wherein the data read circuit (34') is actuatable for further processing and output of data stored in the non-volatile counting and memory circuit (32) by an inquiry signal coming from a user at any moments in time and in that case can be connected to an external energy supply, and the control circuit (30) does not allow a counting and storage operation when a data read operation is effected by the data read circuit (34).

5. A position detector as set forth in claim 3, wherein the comparator circuit (22) is operable to produce the pulse recognition signal when the amplitude of a voltage pulse coming from the induction coil (7), after passing through a peak value, passes through a predeterminable level, and said pulse recognition signal is effective to cause implementation of a counting and storage operation.

6. A position detector as set forth in claim 3, wherein the comparator circuit (22) is operable to produce the pulse recognition signal when the rising absolute value of the voltage at the at least one capacitor (28) passes through a predeterminable level, said pulse recognition signal being effective to cause implementation of a counting and storage operation, and including a voltage limiting circuit (26) for limiting the capacitor voltage to a predeterminable maximum value, wherein said maximum value and the capacitance of the at least one capacitor (28) are matched to the energy consumption, which occurs upon the implementation of a single counting and storage operation, of the circuit parts (30, 32) involved therein, in such a way that after the conclusion of a counting and storage operation the capacitor (28) is discharged to such an extent that upon re-charging of the capacitor the comparator circuit (22) is again operable to produce a pulse recognition signal.

7. A position detector as set forth in claim 3, wherein the comparator circuit (22) is operable to produce the pulse recognition signal when the rising absolute value of the voltage at the at least one capacitor (28) passes through a predeterminable level, said pulse recognition signal being effective to cause the implementation of a counting and storage operation, and including a discharge circuit for discharging the at least one capacitor (28) after the implementation of each counting and storage operation.

8. A position detector as set forth in claim 4, wherein the control circuit includes a first memory (70) which upon the occurrence of a pulse recognition signal is set and is operable to deliver a counting signal level, a second memory (72) which upon the occurrence of an inquiry signal is set and is operable to deliver a blocking signal level, a blocking circuit (74) having first and second inputs, means connecting one said input to the output of the first memory (70) and means connecting the other said input to the output of the second memory (72) wherein the blocking circuit (74) is operable to pass the counting signal level to an edge-sensitive counting input of the counting and memory circuit (32) for triggering a counting and storage operation only when no blocking signal level occurs at its other input, the arrangement being such that after conclusion of a storage operation in the counting and memory circuit (32) a reset pulse is applied to the first memory (70) and after conclusion of a data output to the user a reset pulse is applied to the second memory (72), wherein depending on respective availability the control circuit (30) is supplied with electrical energy from one of the external energy supply and the at least one capacitor (28).

9. A position detector as set forth claim 1, wherein the rectifier circuit (24, 24') consists of only one diode.

10. A position detector as set forth in claim 1, wherein the rectifier circuit (24, 24') comprises one of a switching transistor switchable between a forward state in which a minimum forward voltage is dropped thereat and a blocking state in which it does not pass any current, and a Grätz bridge circuit comprising diodes of which first and second respective diodes are short-circuitable by transistors connected in parallel relationship therewith.

11. A position detector as set forth in claim 1, wherein the non-volatile counting and memory circuit (32) is a FRAM.

12. A position detector as set forth in claim 1, wherein the ferromagnetic element (6) comprises one of a pulse wire, and a Wiegand wire.

13. A position detector as set forth in claim 1, wherein the circuit units of the electronic system and if present a voltage limiting circuit (26), a further rectifier circuit (24') and a further capacitor (28') are combined together in an integrated circuit component (20).

14. A position detector as set forth in claim 1, wherein at least some of the circuit units of the electronic system and/or if present a voltage limiting circuit (26), a further rectifier circuit (24') and a further capacitor (28') are combined together in an integrated circuit component (20).

15. A position detector as set forth in claim 1, wherein the exciter magnet (2) and the ferromagnetic element (6) have longitudinal axes (3, 10) in two parallel planes having a common normal which is an axis of rotation (4).

16. A position detector as set forth in claim 1, wherein geometrical centroids of first and second exciter magnets (3, 9) of opposite polarity and of the ferromagnetic element (6) are in a plane having a normal which is an axis of rotation (4), and the longitudinal axes (3, 10) of said elements extend in parallel relationship with the axis of rotation (4).

17. A position detector as set forth in claim 1, wherein the exciter magnet (2) and the ferromagnetic element (6) are in a plane having a normal which is an axis of rotation (4), and the ferromagnetic element (6)

and the exciter magnet (2) are arranged in radial relationship with the axis of rotation (4).

18. A position detector as set forth in claim 1, wherein the exciter magnet (2) and the ferromagnetic element (6) are in a plane and are oriented in mutually perpendicular relationship.

19. A position detector as set forth in claim 3, including a transmitter operatively associated with the data read circuit (34'), the transmitter being operable by way of a radio section to make data from the counting and memory circuit (32) available to a receiver circuit at the user.

20. A position detector as set forth in claim 1, wherein the data read circuit (34, 34') is also operable for reading identification data into the non-volatile counting and memory circuit (32).

* * * * *